(12) United States Patent
Hazlewood et al.

(10) Patent No.: US 8,071,665 B2
(45) Date of Patent: Dec. 6, 2011

(54) INKJET PRINTING

(75) Inventors: Shaun Christopher Hazlewood, Haverhill (GB); Natasha Jeremic, Royston (GB)

(73) Assignee: Xennia Technology Limited, Letchworth, Hertfordshire (GB)

( * ) Notice: Subject to any disclaimer, the term of this patent is extended or adjusted under 35 U.S.C. 154(b) by 686 days.

(21) Appl. No.: 11/992,828

(22) PCT Filed: Sep. 14, 2006

(86) PCT No.: PCT/GB2006/003401
§ 371 (c)(1),
(2), (4) Date: Mar. 28, 2008

(87) PCT Pub. No.: WO2007/036692
PCT Pub. Date: Apr. 5, 2007

(65) Prior Publication Data
US 2009/0232988 A1    Sep. 17, 2009

(30) Foreign Application Priority Data
Sep. 30, 2005    (GB) .................................... 0519941.9

(51) Int. Cl.
| | |
|---|---|
| *B41J 2/01* | (2006.01) |
| *B41J 2/05* | (2006.01) |
| *B41J 2/175* | (2006.01) |
| *C08F 20/00* | (2006.01) |
| *C08F 22/20* | (2006.01) |
| *C08F 26/00* | (2006.01) |
| *C08F 26/08* | (2006.01) |
| *C08F 26/10* | (2006.01) |
| *C08F 126/00* | (2006.01) |
| *C08F 120/20* | (2006.01) |
| *C08F 220/10* | (2006.01) |
| *C08F 220/20* | (2006.01) |
| *C08F 220/68* | (2006.01) |
| *C08F 222/20* | (2006.01) |
| *C08F 226/00* | (2006.01) |
| *C08G 73/10* | (2006.01) |
| *C08J 3/00* | (2006.01) |
| *C08J 7/02* | (2006.01) |
| *C08K 5/06* | (2006.01) |
| *C09D 5/00* | (2006.01) |
| *C09D 11/00* | (2006.01) |
| *G01D 11/00* | (2006.01) |

(52) U.S. Cl. ................ 523/160; 347/1; 347/56; 347/85; 347/95; 347/100; 347/102; 523/161; 524/366; 524/376; 526/263; 526/264; 526/310; 526/312; 526/318; 526/318.1; 526/320; 526/321; 526/323.1; 526/328; 526/328.5; 526/329.6

(58) Field of Classification Search ................ 523/160, 523/161; 524/366, 376; 526/263, 264, 310, 526/312, 318, 318.1, 320, 321, 323.1, 328, 526/328.5, 329.6; 347/1, 56, 85, 95, 100, 347/102
See application file for complete search history.

(56) References Cited

U.S. PATENT DOCUMENTS

| | | | |
|---|---|---|---|
| 5,270,368 A | 12/1993 | Lent et al. ..................... 524/236 |
| 2001/0047044 A1 | 11/2001 | Tanabe et al. ................... 522/75 |
| 2003/0134931 A1 | 7/2003 | Chatterjee et al. ............. 522/178 |

FOREIGN PATENT DOCUMENTS

| | | |
|---|---|---|
| EP | 1 036 831 A1 | 9/2000 |
| EP | 1234860 | 8/2002 |
| EP | 1 469 049 A1 | 10/2004 |
| GB | 2 108 986 A | 5/1983 |
| WO | WO 2004/061019 | 7/2004 |

*Primary Examiner* — Patrick Niland
(74) *Attorney, Agent, or Firm* — Morgan Lewis & Bockius LLP

(57) ABSTRACT

A single phase aqueous composition suitable for thermal inkjet printing comprises a mixture of curable materials including at least two curable oligomers; and one or more co-solvents for the curable materials.

19 Claims, 1 Drawing Sheet

INKJET PRINTING

FIELD OF THE INVENTION

Figure 1:

This invention relates to inkjet printing, particularly thermal inkjet printing, and concerns compositions suitable for thermal inkjet printing.

BACKGROUND TO THE INVENTION

Inkjet printing processes fall into two main types: continuous processes and drop-on-demand (DOD) processes. Continuous processes use electrically conductive ink to produce a stream of drops of electrically charged ink that are deflected by an electric field to an appropriate location on a substrate. In DOD processes, individual drops of ink are expelled from the nozzle of a print head either by vibration of a piezoelectric actuator (in piezoelectric inkjet printing) or by heating the ink to form a bubble (in thermal inkjet printing, also known as bubble jet printing). Thermal inkjet printing has advantages over piezoelectric inkjet printing, with printers and print heads being lower cost and with the printing process being able to achieve better resolution.

Inkjet inks need to satisfy a number of requirements, including the following:

Viscosity must be appropriate. With DOD inks there are greater limitations on inks for thermal printing than for piezoelectric printing, with it generally being necessary for in to have a viscosity of below about 4 mPa·s at print head operating temperature (which is typically 40-50° C.), which usually equates to a viscosity of less than 6.5 mPa·s at room temperature (25° C.), to be capable of being thermally inlet printed. In this specification, all viscosity values are at 25° C. unless otherwise specified.

The ink must not cause unacceptable levels of clogging or blockage of printing nozzles.

The ink must not result in build up of deposits on the ejection heaters of thermal inkjets print heads (a process known as "kogation") to an unacceptable level during the working life of a print head.

The ink should be stable in storage, without settling out or coagulation of materials.

The resulting print needs to saws desired characteristics depending on the field of use, with possible relevant factors including water fastness, scratch resistance, durability, lack of shrinkage, lack of cracking, flexibility, optical density (for coloured inks), uniformity of deposition.

Curable DOD is are known. These typically comprise one or more monomers etc. curable in response to appropriate conditions, typically ultra violet (UV), infra red (IR) or heat.

U.S. Pat. No. 5,623,001 (Scitex) discloses TV-curable DOD inkjet inks, particularly for piezoelectric printing, comprising water (20-75%) and water-miscible UV-curable monomer and/or oligomer e.g. acrylic materials (20-60%). The document makes no reference to thermal inkjet printing, and does not teach how to produce inks with a viscosity of less than 6.5 mPa·s, suitable for thermal inkjet printing, nor does it teach how to prevent kogation.

U.S. Pat. No. 5,952,401 (Canon) discloses curable water-based inks for piezoelectric and bubble jet printing using curable monomers. The document does not address the issue of prevention of kogation caused by curable materials.

U.S. Pat. No. 6,294,592 (BASF) discloses curable inkjet inks exemplified by UV-curable polyurethane dispersions. The document does not address issues of viscosity or prevention of kogation.

Curable monomers and oligomers tend to have limited solubility/miscibility in water, and substantial practical difficulties arise in producing water-based inks with sufficiently low viscosity (below 6.5 mPa·s) to be useful for thermal inkjet printing that do sot undergo undesirable phase separation, do not cause clogging or blockage of printing nozzles, do not result in unacceptable levels of kogation, and that produce prints with appropriate, useful properties.

We have found that by use of carefully selected mixtures of curable materials together with a water-compatible solvent (referred to as a co-solvent) for the curable materials it is possible to produce low viscosity compositions suitable for inkjet printing. We have also found various materials that are effective in preventing or reducing kogation, referred to herein as anti-kogation agents.

SUMMARY OF THE INVENTION

In one aspect, the present invention provides a single phase aqueous composition suitable for thermal inkjet printing, comprising a mixture of curable materials including at least two curable oligomers; and one or more co-solvents for the curable materials.

The composition is suitable for thermal inkjet printing and so generally has a viscosity of less than 6.5 mPa·s (at 25° C.).

The term "single phase" is used to mean that the curable materials are fully in solution, being dissolved in water and co-solvent or being fully miscible therewith. No phase separation or settlement occurs. The single phase composition may nevertheless possibly carry other materials in solid form to achieve required application properties. For instance fine particles of pigment may be carried in dispersion, in conventional manner, to provide colour.

The curable materials harden on curing following exposure to a suitable curing stimulus, e.g. UV, heat or infrared (with appropriate initiators being used) after printing to form printed material usually in the form of a film.

The two oligomers are preferably chemically distinct, being from different chemical classes, rather than being differ grades of the same material, e.g. having different chain lengths, molecular weights etc.

The curable oligomers preferably include one or more alkoxylated trimethylolpropane acrylates. These are suitably present in an amount in the range 1-10%, preferably 3-6% by weight of the weight of the composition.

The curable oligomers preferably include one or more polyalkene glycol acrylates. These are suitably present in an amount in the age 3-15%, preferably 4-10% by weight of the weight of the composition.

Good results have been obtained using a mixture of at least one alkoxylated trimethylolpropane acrylate and at least one polyalkene glycol acrylate. Oligomers in the first class have reasonable water solubility and produce printed films with good properties, e.g. in terms of hardness and water resistance, but they have relatively high viscosities. Oligomers in the second class have higher water solubility and lower viscosity, but produce softer, more water sensitive films. By using a mixture of tem two classes of oligomers, a good overall balance of properties can be achieved.

The alkoxylated trimethylolpropane acrylate oligomer includes acrylates, methacrylates, and also multifuctional (meth)acrylates including di(meth)acrylates, tri(meth)acrylates etc. The number of functionalities affects the properties of the resulting cured films, with higher functionality materials producing films with higher shrinkage, higher water/chemical resistance and better durability. Higher functionality also provides fast cue response; materials with 1 or 2 functional groups usually cure/polymerise slowly and require a greater ratio of initiator and longer exposure to curing conditions. Some of the disadvantages of materials with very high frictionality (5 or higher) are that they have high viscosity and they produce films with very high shrinkage and low flexibility. Materials with 4 functionalities increase cross linking density, and chemical resistance and scratch resistance of printed films, but have high viscosities and so should be used sparingly (typically at 1-2% by weight). Tri(meth) acrylates are curly preferred for their balance of properties.

The alkoxylated trimethylolpropane acrylate oligomer may be ethoxylated, propoxylated etc, with ethoxylated oligomers generally being preferred as they have great water solubility. The extent of alkoxylation affects the water solubility of the oligomer, and also the water sensitivity of the resulting printed material, with higher levels of alkoxylation producing more water soluble oligomers and more water sensitive prints. It is preferred to use a material with 20 ethylene oxide units (20 EO), possibly in combination with smaller amounts of material with lower levels of ethoxylation, for a good balance of properties. Good results have been obtained with ethoxylated (20 EO) trimethylolpropane triacrylate (TMPTA). Ti mat has good water solubility, fast cure response and low skin irritancy and produces printed films with good properties including good water and solvent resistance and lack of brittleness, i.e. good ductility.

Suitable commercially available materials include the following UV-curable materials available from Sartomer: SR 415 (EO 20 TMPTA), CN 435 and SR 9015 (EO 15 TMPA). A useful multifunctional material in this class is SR 494 (EO 4 pentaerythritol tetraacrylate—EO 4 PETA).

Good results have been obtained with a mixture of 3.5% by weight BO 20 TMPTA (SR 415) and 1% by weight EO 4 PETA (SR 494).

The polyalkene glycol acrylate oligomer includes acrylates, methacrylates and also multifunctional (meth)acrylates, including di(meth)acrylates, tri(meth)acrylates etc. Diacrylates are currently preferred. Compared with diacrylates, methacrylates and dimethacrylates have lower viscosities (which is advantageous), but slower cure responses (which is disadvantageous). The polyalkene may be polyethylene, polypropylene etc, with polyethylene glycols being favoured. The currently preferred material is thus polyethylene glycol diacrylate (PEG DA). PEG DA is available in a range of different grades having different molecular weigh. The preferred material is PEG 400 DA (e.g. in the form of SR 344 from Sartomer) taking into account factors such as water solubility, pigment compatibility, viscosity and cure response speed. PEG 200 DA (e.g. SR 259 from Sartomer) has lower viscosity than PEG 400 DA (because of the lower molecular weight) but it has the disadvantages of having lower water solubility and of bang less stable and so having a shorter shelf life. PEG 600 DA (e.g. SR 610 from Sartomer) is completely water miscible and results in very flexible prints. Disadvantages of PEG 600 DA are higher viscosity and higher water sensitivity of the prints compared to PEG 400 DA and PEG 200 DA.

Good results have been obtained with compositions including 7% by weight PEG 400 DA (SR 344).

Multifuctional oligomers may optionally be included in the composition in small amounts (typically 1-2% by weight and not more than 4% by weight as they have high viscosities) in order to increase cross linking density and improve reactivity and scratch resistance of resulting films. Possible materials of this sort include:

pentaerythrtol tetraacrylate (PETA) (e.g. SR 295 from Sartomer). This material has high viscosity. It is also a solid at room temperature so it significantly increases the viscosity of the composition, affecting its jettability.

dimethylolpropane tetraacrylate (DMPTA) (e.g. SR 355 from Sartomer). This imparts excellent properties to cured films, but has high viscosity.

dipaerythritol pentaacrylate (DPEPA) (e.g. SR 399 from Sartomer). This is hydrophilic but very viscous. It significantly improves water fastness of printed films but adversely affects composition viscosity.

EO pentaerythritol tetraacrylate (BETA) (e.g. SR 494 from Sartomer) as referred to above. This provides a good compromise between reactivity, multifunctionality, chemical resistance, water fastness and viscosity.

The composition desirably includes one or more curable mono materials. These generally have low viscosities, and so act to reduce the viscosity of the compositions. They act as curable humectants, helping jetting stability and printing reliability and preventing drying on the nozzles. They cure in with the oligomers, increasing film thickness. Because they cure in with the oligomers hey do not have to be removed from the print before or after curing. It is preferred to use an n-vinyl monomer material, preferably n-vinyl acetamide, as this is found to give good results. N-vinyl pyrrolidone (NVP) is also useful, but is desirably avoided for health and safety reasons. Other possibilities include r-methyl-n-vinyl aide. N-acryloyl morpholine (which is also curable) is a useful material in combination with an n-vinyl monomer material. The combination of n-vinyl acetamide and n-acryloyl morpholine has been found to give good results. The curable monomer material, particularly n-vinyl materials, may also function as co-solvent. The n-vinyl monomers are also surprisingly found to be useful in preventing or reducing kogation, and so function as anti-kogation agents. The monomer material may be used in an amount of up to about 40% by weight of the total weight of the composition, but is typically used at levels of 25% or less.

For example, good results have been obtained with mixtures of 5% by weight n-vinyl acetamide and 5% by weight n-acryloyl morpholine in combination with other material(s) functioning solely as co-solvent (to be discussed below).

Viscosity values for various UV-curable materials (obtained from the suppliers of the materials) are given in the table below.

| Commercial name | Chemical name | Viscosity (mPa·s) @ 25° C. | |
|---|---|---|---|
| | | Range | Precise |
| SR 252 | PEG (600) DM | 55-85 | 70 |
| SR 259 | PEG (200) DA | 15-35 | 25 |
| SR 295 | PETA | 200-500 @ 38° C. | 350 @ 38° C. |
| SR 344 | PEG (400) DA | 40-75 | 60 |
| SR 355 | DMPTA | 450-900 | 700 |
| SR 399 | DPEPA | 7000-21000 | 14000 |
| CN 435 or SR 9015 | EO 15 TMPTA | 100-240 | 170 |
| SR 415 | EO 20 TMPTA | 150-300 | 230 |
| SR 494 | EO 4 PETA | 100-200 | 150 |
| CD 550 | Methoxy PEG (350) MM | 28 | 22 |
| CD 552 | Methoxy PEG (550) MM | 39 | 39 |
| SR 603 OP | PEG (400) DM | 20-70 | 45 |
| SR 604 | PPG MM | 25-40 | 33 |
| SR 610 | PEG (600) DA | 50-110 | 80 |
| NVP | N-vinyl pyrrolidone | 2.4 @ 20° C. | 2.4 @ 20° C. |

-continued

| Commercial name | Chemical name | Viscosity (mPa·s) @ 25° C. | |
|---|---|---|---|
| | | Range | Precise |
| NAM | N-acryloyl morpholine | 12 | 12 |
| NVC | N-vinyl caprolactam | solid | solid |
| HEMA | (2-hydroxyethyl methacrylate)2-(2-ethoxyethoxy)ethyl acrylate | 5 | 5 |

We have also found that tetra butyl ammonium bromide (TBAB) is effective as an anti-kogation agent, and is compatible with the remainder of the composition. This material should be present in small amount, typically less than 5% by weight. Good results have been obtained with compositions including TBAB at 3.5% by weight.

Thus, in a further aspect the invention provides a single phase aqueous composition suitable for thermal inkjet printing, comprising one or more curable materials; one or more co-solvents for the curable materials; a an anti-kogation agent selected from n-vinyl acetamide, tetra butyl ammonium bromide, n-methyl-n-vinyl acetamide, n-vinyl pyrrolidone and mixtures thereof.

Good results have been obtained with an anti-kogation agent comprising a mixture of n-vinylacetamide and TBAB.

Other features of this aspect of the invention are preferably as specified elsewhere in connection with other aspects of the invention.

The co-solvent functions as a solvent for the curable materials. The co-solvent ideally has good compatibility with water and low viscosity. The co-solvent is typically selected from water-soluble organic solvents including alcohols, thiols, ethers etc. Glycol ethers function well as co-solvents, as they have good water compatibility, low viscosities and, high boiling points. Further, glycol ethers functions as humectants, preventing drying in print head nozzles. Ethylene glycol monobutyl ether (EGMBE) is particularly preferred. A non-exhaustive list of possible co-solvents includes the following: isopropyl alcohol (IPA) (which gives good jetting), n-methyl pyrrolidone (NMP), methoxy propyl acetate (MPA) (which has a low viscosity), diacetone alcohol (DAA), methoxy propanol (MeOPr), methyl alcohol, ethyl alcohol, methyl lactate, ethyl lactate, 2-pyrrolidone, 1,4 butanediol, dimethyl sulphoxide (DMSO), glycol ethers, particularly propylene glycol n-butyl ether, dipropylene glycol, tripropylene glycol, 2-methyl-1,3-propanediol, propylene glycol methyl ether, propylene glycol ethyl ether, dipropylene glycol methyl ether, dipropylene glycol n-butyl ether, tripropylene glycol methyl ether, tripropylene glycol n-butyl ether, propylene glycol methyl ether acetate, dipropylene glycol methyl ether acetate, propylene glycol n-propyl ether, dipropylene glycol n-propyl ether, ethylene glycol n-butyl ether (or ethylene glycol monobutyl ether (EGMBE)), diethylene glycol n-butyl ether, triethylene glycol butyl ether, diethylene glycol methyl ether, triethylene glycol methyl ether.

As noted above, certain curable monomers may also function as co-solvents, e.g. n-vinyl monomer materials such as n-vinyl acetamide, n-vinyl pyrrolidone, n-methyl-n-vinyl acetamide, etc., and also n-acryloyl morpholine.

In one particular embodiments of the invention, the composition includes a co-solvent which does not also function as a monomer material. Such a co-solvent may be used in conjunction with a curable monomer material.

In another particular embodiment of the invention, the composition includes only co-solvent which also functions as a monomer material. Of particular interest are compositions using n-vinyl acetamide as monomer and co-solvent, possibly without other co-solvent materials.

In a preferred aspect, the invention provides a single phase aqueous composition suitable for thermal inkjet printing, comprising a mixture of curable materials including at least two curable oligomers, the curable oligomers including an alkoxylated trimethylolpropane acrylate and a polyalkene glycol acrylate; and one or more co-solvents for the curable materials.

A further preferred aspect of the invention resides in a single phase aqueous composition suitable for thermal inkjet printing, comprising a mixture of curable materials including at least two curable oligomers and at least one curable monomer, the curable oligomers iwcluding an alkoxylated trimethylolpropane acrylate and a polyalkylene glycol acrylate, and the monomer comprising an n-vinyl compound; and one or more co-solvents for the curable materials.

In this aspect, n-vinyl acetamide preferably functions as both the monomer and the co-solvent.

In another aspect the invention provides a single phase aqueous composition suitable for thermal inkjet prig, comprising a mite of curable materials including at least two curable oligomers and a curable n-vinyl monomer; and a non curable co-solvent for the curable materials.

Examples of non-curable co-solvents include EGMBE, NWP, IPA etc, as listed above.

Mixtures of materials may be used as the co-solvent. One preferred co-solvent comprises a mixture of r-acryloyl morpholine (which is curable, has a high boiling point and reasonable viscosity) and ethylene glycol monobutyl ether. The n-acryloyl morpholine is conveniently present in an amount of 5% of the weight of the composition and the EGMBE comprises about 16% of the weight of the composition.

The co-solvent is typically present in an amount in the range 15 to 30% by weight of the total weight of the composition.

The composition optionally includes surfactant in small amount (say up to 1% by weight) to improve wetting. Suitable sock can be selected having regard to the substrate on which the composition is to be printed. Suitable surfactants include the following:

| Commercial name | Chemical name | Supplier |
|---|---|---|
| BYK 333 | Polyether modified poly-dimethyl-siloxane | BYK Chemie GmbH |
| BYK 381 | Ionic solution of polyacrylic copolymer | BYK Chemie GmbH |
| FC 4430 | Fluorosurfactant | 3M |
| FC 4432 | Fluorosurfactant | 3M |
| Dynol 604 | Non-ionic acetylenic glycol-based surfactant | Air Products |
| Surfadone LP 100 | N-alkyl pyrrolidone | ISP |

Fluorosurfactants e.g. PC 4430 and PC 4432, e.g. in an amount of 0.2% by weight, are currently favoured.

The composition typically includes a suitable initiator appropriate to the curable materials, e.g. a thermal initiator, photoinitiator etc. Stable initiators are well known to those skilled in the art, as are suitable levels of use (typically less than about 5% by weight). Examples of photoinitiators include Irgacure 2959, Irgacure 184, 651, 127, 1800, 819

(Ciba), Darocure 1173 etc. (Irgacure and Darocure are Trade Marks). Examples of thermal initiators include VA 044 (2,2'-azobis[2-(2-imidazolin-2-yl)propane]dihydrochloride), VA 057 (2,2'-azobis[N-(2-carboxyethyl)-2-methyl-propionamidine] from Wako Chemicals. Some curable materials will cure without the presence of an initiator, e.g. in response to exposure to an electron beam (known as e-beam curing).

The composition also includes water, usually in an amount of at least about 35% by weight, more typically at least about 45% by weight.

The composition may include an optional stabiliser such as methylhydroquinone.

The composition may be used as is, e.g. to print a clear coating or layer or film on a substrate. Alternatively, the composition may be used as a vehicle e.g. for carrying a dye in solution or a dispersed pigment in known manner for printing of text or images. Suitable pigments are well known. For example, for prig black text or images it is appropriate to use aqueous dispersions of carbon black such as AcryJet 170 (Rohm and Haas), Hostajet (Clariant), Cab-O-Jet 300 and Cab-Jet 200 (Cabot Corp.). Cab-O-Jet 200 has sulfonated groups at the surface of the pigment and Cab-O-Jet 300 has carboxylate groups at the surface of the pigment for dispersion purposes. AcryJet, Hostajet and Cab-O-Jet are Trade Marks.

Further details of conventional and optional ingredients for printing inks and their use are given, e.g. in U.S. Pat. No. 6,294,592.

polyethylene, polypropylene, polyvinyl chloride (PVC), polycarbonate, polyimide film etc) etc.

Even on difficult to handle non-porous substrates, the invention can provide compositions that are fast drying and produce good quality prints of high durability. In particular, the resulting prints may satisfy the requirements of good scratch resistance, water fastness, flexibility and optical density (for coloured inks). The compositions find particular application in industrial printing onto non-porous substrates.

Figure 2:
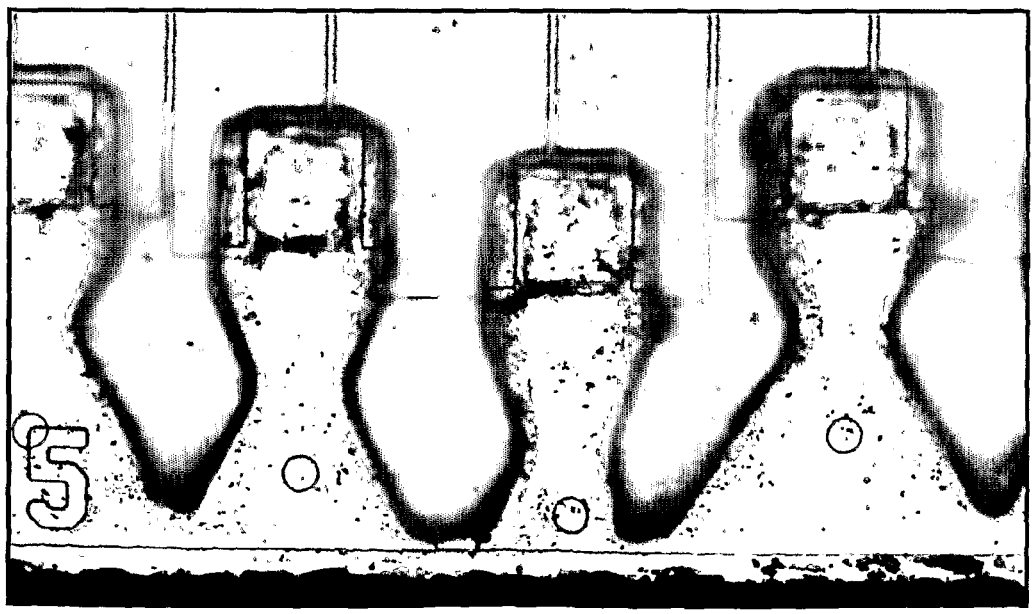

The invention will be further described, by way of illustration, in the following Examples and with reference to the accompanying figures, in which:

FIG. 1 is a photograph of part of an inkjet print head showing 4 print head nozzles with associate heaters and ink pathways, after printing one full cartridge of ink formulation H17; and FIG. 2 is similar to FIG. 1 for a print head after printing two full cartridges of ink formulation H45b.

EXAMPLES

In the Examples all quantities are % by weight unless otherwise specified.

The following UV-curable ink formulations were made by mixing the specified ingredients.

| Composition | H4 | H17 | H37 | H38 | H39 | H45b | H50 | H51 |
|---|---|---|---|---|---|---|---|---|
| SR494 | — | 1 | 1 | 1 | 1 | 1 | 1 | 1 |
| SR344 | 9 | 7 | 7 | 7 | 7 | 7 | 7 | 7 |
| SR415 | 4.5 | 3.5 | 3.5 | 3.5 | 3.5 | 3.5 | 3.5 | 3.5 |
| n-vinyl pyrrolidone | 24.8 | — | — | — | — | — | — | — |
| n-acryloyl morpholine | — | 5 | 5 | 5 | 5 | 5 | 5 | 5 |
| Water | 44.9 | 52.3 | 43.3 | 54.8 | 57.3 | 46.05 | 46.05 | 49.55 |
| Cab-O-Jet 300 | 12.5 | 9 | 9 | 9 | 9 | — | — | — |
| Cab-O-Jet 200 | — | — | — | — | — | 6.75 | 6.75 | 6.75 |
| Irgacure 2959 | 4 | 3 | 3 | 3 | 3 | 3 | 3 | 3 |
| EGMBE | — | 16 | — | 16 | 16 | 16 | 16 | 16 |
| DMSO | — | — | 15 | — | — | — | — | — |
| Isopropyl alcohol | — | 3 | 5 | 3 | 3 | 3 | 3 | 3 |
| n-vinyl acetamide | — | — | 5 | 3 | 3 | 5 | — | 5 |
| n-methyl-n-vinyl acetamide | — | — | — | — | — | — | 5 | — |
| n-vinyl caprolactam | — | — | 3 | 3 | 3 | — | — | — |
| TBAB | — | — | — | 3.5 | — | 3.5 | 3.5 | — |
| Ammonium nitrate | — | — | — | — | 1 | — | — | — |
| FC4430 | 0.2 | 0.2 | 0.2 | 0.2 | 0.2 | 0.2 | 0.2 | 0.2 |
| Viscosity (mPa · s) | 4.2 | 3.6 | 4.1 | 4.8 | 3.7 | 6.1 | 5.1 | 4.9 |
| Jetting reliability | 4 | 1 | 3 | 4 | 3 | 5 | 4 | 4 |
| Wet fastness | 2 | 4 | 5 | 5 | 5 | 5 | 5 | 5 |

The compositions of the invention are used in conventional manner, using a thermal inlet printer. The compositions are printed onto the intended substrate and exposed to an appropriate curing regime depending on the nature of the curable materials, e.g. involving exposure to UV light, heat etc. A drying step may also be required, e.g. using exposure to microwaves. For UV-curable materials we have found it can be beneficial to precede curing with a brief drying step, e.g. by exposure to an infra red source, as his has been found to produce films with improved wet-fastness and durability.

The compositions may be printed onto a variety of substrates, and find particular use with non-porous and semi-porous substrates such as metals, plastics (e.g. polyesters such as polyethylene terephthalate (PET), low density (LD) polyethylene, orientated polystyrene, high density (HD)

All of the is were in the form of a single phase aqueous composition, carrying dispersed pigment.

Viscosity measurers were performed using a Brookfield DV-II+ viscometer opting with a rotational speed of 60 rpm at a temperature of 25° C. Briefly, 17.5 ml of the ink composition was transferred to the chamber, to which a suitable spindle was then lowered into the chamber and left until the temperature stabilized. Measurements were taken every 30, 60, 120 and 300 seconds, until a reproducible viscosity reading could be obtained.

The compositions were printed onto a range of different substrates at 600×600 dpi from a Wolke (Wolke is a Trade Mark) printer using an HP45A cartridge (with capacity of 43 ml ink). The printed material was subjected to a pre-cure heating/drying step by exposure for 1 second to an infra red lamp (300 Watt bulb) and then cured by exposure to UV from a 500 Watt Fusion Light Hammer 6 system with an 'H' bulb, being conveyed below the IR lamp and UV system at a line speed of 30 m/min. (Fusion Light Hammer 6 is a Trade Mark)

Jetting reliability was assessed by observing the print quality at regular intervals through the life of the printer cartridge. A product should be able to jet at least an entire cartridge of ink before the print quality is degraded. Wet fastness was assessed by wiping with a wet cloth and examining the print for loss of ink. Jetting reliability and wet fastness were assessed on a scale of 1 to 5. For compositions to be of practical use, they should have a jetting reliability rating of at least 4. For applications where wet fastness is important, the composition should have a wet fastness rig of at least 4, although there are some applications where wet fastness is not of significance.

FIGS. 1 and 2 show print heads after printing with ink formations H17 and H45b, respectively. With ink H17 substantial deposits can be seen, accounting for the jetting reliability rating of 1. This performance is attributed to the absence of an anti-kogation agent. In contrast, with ink H45b, no significant deposits can be seen even after printing two full cartridges of ink.

A summary of results of tests using ink H45b on a variety of substrates is given below.

| Material | Subjective print quality | Touch dry? (Post cure) | 3M Tape Test (% Removal) | Wet Abrasion Test (% Removal) |
|---|---|---|---|---|
| Polycarbonate | ✓ | ✓ | 0 | 80 |
| HD Polyethylene | ✓ | ✓ | 0 | 0 |
| PET | ✓ | ✓ | 0 | 80 |
| LD Polyethylene | ✓ | ✓ | 100 | 100 |
| Medical Tyvek | x bleeds | ✓ | 0 | 0 |
| Clear PVC | ✓ | ✓ | 10 | 50 |
| Oriented Polystyrene | ✓ | ✓ | 40 | 100 |
| Polypropylene | ✓ | ✓ | 100 | 100 |
| CIS Solid Bleached Board (Coated) | ✓ | x smudges | 50 | 100 |
| Ink systems S/F-HD-Gloss OP Varnish | ✓ | ✓ | 0 | 90 |
| Diamond Varnish on 120 Centura | ✓ | ✓ | 20 | 80 |
| Aqueous Cork Gloss on 120 Centura | ✓ | ✓ | 0 | 30 |
| Sterling Ultracover Gloss on 120 Centura | ✓ | x smudges | 70 | 100 |
| Gans Special Dull Varnish on 120 Centura | x bleeds | ✓ | 0 | 20 |
| No coating on 120 Centura | ✓ | ✓ | 50 | 95 |
| UV Coated on 120 Centura | x bleeds | ✓ | 20 | 100 |
| Acrylic coated Melinex | ✓ | ✓ | 0 | 0 |
| Aqueous Ni Coat Hi gloss on 120 Centura | ✓ | ✓ | 0 | 70 |

Test Methods:
1. 3M Tape test (3M is a Trade Mark). A piece of 3M 616 tape was applied with firm pressure. After waiting 1 minute the tape was removed and the % film removal recorded.
2. Wet abrasion test. The test sample was submerged in water and rubbed 20 times with firm thumb pressure. The % film removal was recorded.

Composition H45b is the preferred formulation. As well as having excellent jetting reliability and wet fastness, it also shows good start-stop performance (i.e. where a cartridge can be left idle after a period of continuous printing and on restarting printing is readily recoverable). No significant material was deposited onto print head heaters after printing two full cartridges of composition H45b. Compositions H4 and H38 are also of potential interest for shorter term printing opportunities, and may be further optimisable.

In further experiments, two known ant-kogation agents Dequest 2016 (1-hydroxyethylidene-1,1-phosphonic acid tetra sodium salt) and Dequest 2054 (hexamethylene tetra (methylene phosphonic acid) (as disclosed in US 2003/0015119) were tested in compositions based on H45b in place of TBAB, at levels of 1.2% and 0.5% respectively. However, both materials coagulated on addition to the ink and so are unsuitable for this purpose.

The invention claimed is:
1. A single phase aqueous composition suitable for thermal inkjet printing, comprising
   a mixture of curable materials comprising at least two curable oligomers comprising at least one alkoxylated trimethylolpropane acrylate and at least one polyalkene glycol acrylate and one or more curable monomers comprising an n-vinyl monomer material; and
   one or more co-solvents for the curable materials.
2. A composition according to claim 1, wherein the alkoxylated trimethylolpropane acrylate oligomer comprises a tri(meth)acrylate.
3. A composition according to claim 2, wherein the alkoxylated trimethylolpropane acrylate oligomer comprises ethoxylated trimethylolpropane triacylate.
4. A composition according to claim 3, wherein the alkoxylated trimethylolpropane acrylate oligomer further comprises ethoxylated pentaerythritol tetraacrylate.
5. A composition according to claim 4, wherein the polyalkene glycol acrylate oligomer comprises polyethylene glycol diacrylate.
6. A composition according to claim 1, wherein the curable monomers comprise n-vinyl acetamide.

7. A composition according to claim 1, wherein the curable monomers comprise n-vinyl acetamide in the absence of n-vinyl pyrrolidone.

8. A composition according to claim 1 wherein the curable monomers comprise n-vinyl acetamide and n-acryloyl morpholine.

9. A composition according to claim 1, wherein the co-solvent is a water-soluble organic solvent.

10. A composition according to claim 9, wherein the co-solvent comprises a glycol ether.

11. A composition according to claim 1, wherein the composition comprises an anti-kogation agent.

12. A composition according to claim 11, wherein the anti-kogation agent comprises tetra butyl ammonium bromide.

13. A composition according to claim 1, comprising water in an amount of at least about 35% by weight.

14. A composition according to claim 1, further comprising dye or pigment.

15. A single phase aqueous composition suitable for thermal inkjet printing, comprising
one or more curable materials and one or more curable monomers comprising an n-vinyl monomer material;
one or more co-solvents for the curable materials;
and an anti-kogation agent selected from the group consisting of n-vinyl acetamide, tetra butyl ammonium bromide, n-methyl-n-vinyl acetamide, n-vinyl pyrrolidone and mixtures thereof.

16. A composition according to claim 15, wherein the anti-kogation agent comprises n-vinyl acetamide and tetra butyl ammonium bromide.

17. A method of printing, comprising thermally inkjet printing a composition onto a substrate, wherein the composition is a single phase aqueous composition comprising a mixture of curable materials comprising at least two curable oligomers and one or more curable monomers comprising an n-vinyl monomer material; and one or more co-solvents for the curable materials.

18. A method according to claim 17, wherein the substrate is non-porous.

19. A composition according to claim 10, wherein the glycol ether is ethylene glycol monobutyl ether.

* * * * *